(12) United States Patent
Tarne, I et al.

(10) Patent No.: US 6,707,974 B2
(45) Date of Patent: Mar. 16, 2004

(54) CLAMSHELL DESIGN FOR AN OPTICAL LIGHT MANIFOLD AND METHOD OF PRODUCTION

(75) Inventors: James David Tarne, I, Utica, MI (US); Edwin Mitchell Sayers, Saline, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 19 days.

(21) Appl. No.: 10/066,399

(22) Filed: Jan. 31, 2002

(65) Prior Publication Data

US 2003/0142935 A1 Jul. 31, 2003

(51) Int. Cl.[7] .............................. G02B 6/04; G02B 6/00
(52) U.S. Cl. ...................................... 385/120; 385/147
(58) Field of Search ................................ 385/120, 147

(56) References Cited

U.S. PATENT DOCUMENTS

| | | | |
|---|---|---|---|
| 3,894,024 A | 7/1975 | Cherenko et al. ............ 264/261 |
| 4,170,616 A | 10/1979 | Jebens ............................ 261/1 |
| 4,448,547 A | * 5/1984 | Wickersheim ............... 374/131 |
| 4,560,286 A | * 12/1985 | Wickersheim ............... 374/131 |
| 5,026,984 A | * 6/1991 | Gerdt ..................... 250/227.21 |
| 5,756,013 A | 5/1998 | Yanagihara et al. .......... 264/1.7 |
| 6,039,553 A | 3/2000 | Lundin et al. ............... 425/115 |
| 6,077,462 A | 6/2000 | Lundin et al. ............... 264/1.24 |
| 2001/0055801 A1 | * 12/2001 | Chen et al. ............... 435/287.2 |

* cited by examiner

Primary Examiner—Brian Healy
Assistant Examiner—Tina M Lin
(74) Attorney, Agent, or Firm—Brinks Hofer Gilson & Lione

(57) ABSTRACT

A method of forming an optical light manifold that includes forming a faceted optic, forming an optical faceplate, joining the faceted optic to the optical faceplate to define a cavity therebetween and filling the cavity with a fluid.

50 Claims, 3 Drawing Sheets

CLAMSHELL DESIGN FOR AN OPTICAL LIGHT MANIFOLD AND METHOD OF PRODUCTION

BACKGROUND OF INVENTION

1. Field of Invention

The present invention regards an optical light manifold and a method of production of such an optical light manifold.

2. Discussion of Related Art

Typical light manifolds, usually made from acrylic or other transparent plastics or glass, are difficult to mold as a one-piece product. Glass is often too fragile and heavy, and plastic is not readily moldable due to very inconsistent part thickness required in order to achieve the optical effects desired.

BRIEF SUMMARY OF THE INVENTION

One aspect of the present invention regards an optical light manifold that includes an optical faceplate having a refractive index and defining a light emitting area and a faceted optic having the same refractive index and joined to the optical faceplate defining a cavity. A fluid is disposed within the cavity.

A second aspect of the present invention regards a light emitting system that includes a light source that emits light and a molded optical light manifold that is positioned to receive the light from the light source. The molded optical light manifold includes an optical faceplate having a refractive index and defining a light emitting area and a faceted optic having the same refractive index and joined to the optical faceplate defining a cavity therebetween. A fluid is disposed within the cavity.

A third aspect of the present invention regards a method of forming an optical light manifold that includes forming a faceted optic, forming a faceplate, joining the faceted optic to the faceplate to define a cavity therebetween and filling the cavity with a fluid.

Each aspect of the present invention provides the advantage of achieving higher dimensional stability, optical performance and manufacturability for optical light manifolds.

The present invention, together with attendant objects and advantages, will be best understood with reference to the detailed description below in connection with the attached drawings.

DETAILED DESCRIPTION OF THE INVENTION

Figure 1:
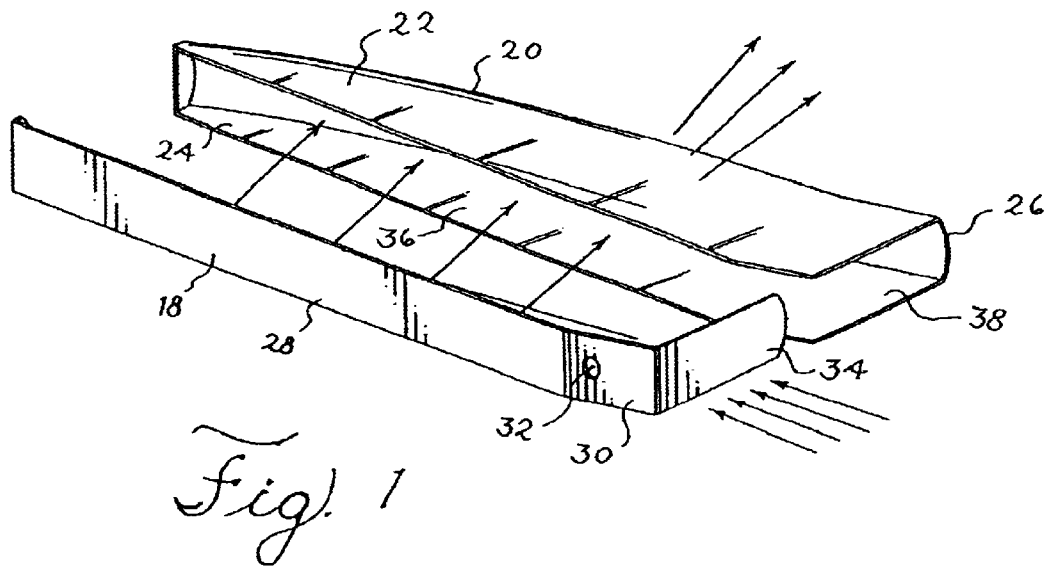
FIG. 1 is an exploded rear perspective view of the front face shell and a faceted part in accordance with the present invention.

Referring to the drawings, FIG. 4 schematically shows an embodiment of a light emitting system 10 to be used with a vehicle, such as a car 12 or truck. It is understood that the light emitting system 10 can be used with other types of vehicles or products that employ optical light manifolds.

Figure 4B:
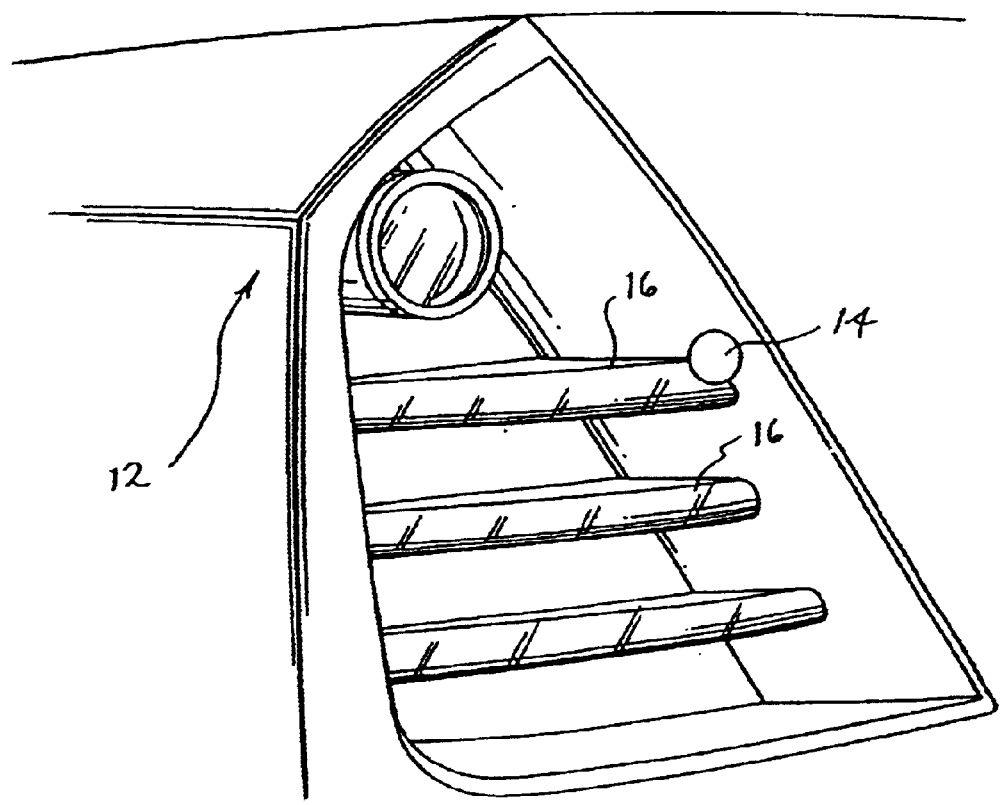
FIG. 4B schematically shows a second embodiment of a light emitting system placed within a rear portion of a vehicle that employs the optical light manifold of FIG. 3 in accordance with the present invention.
Figure 4A:
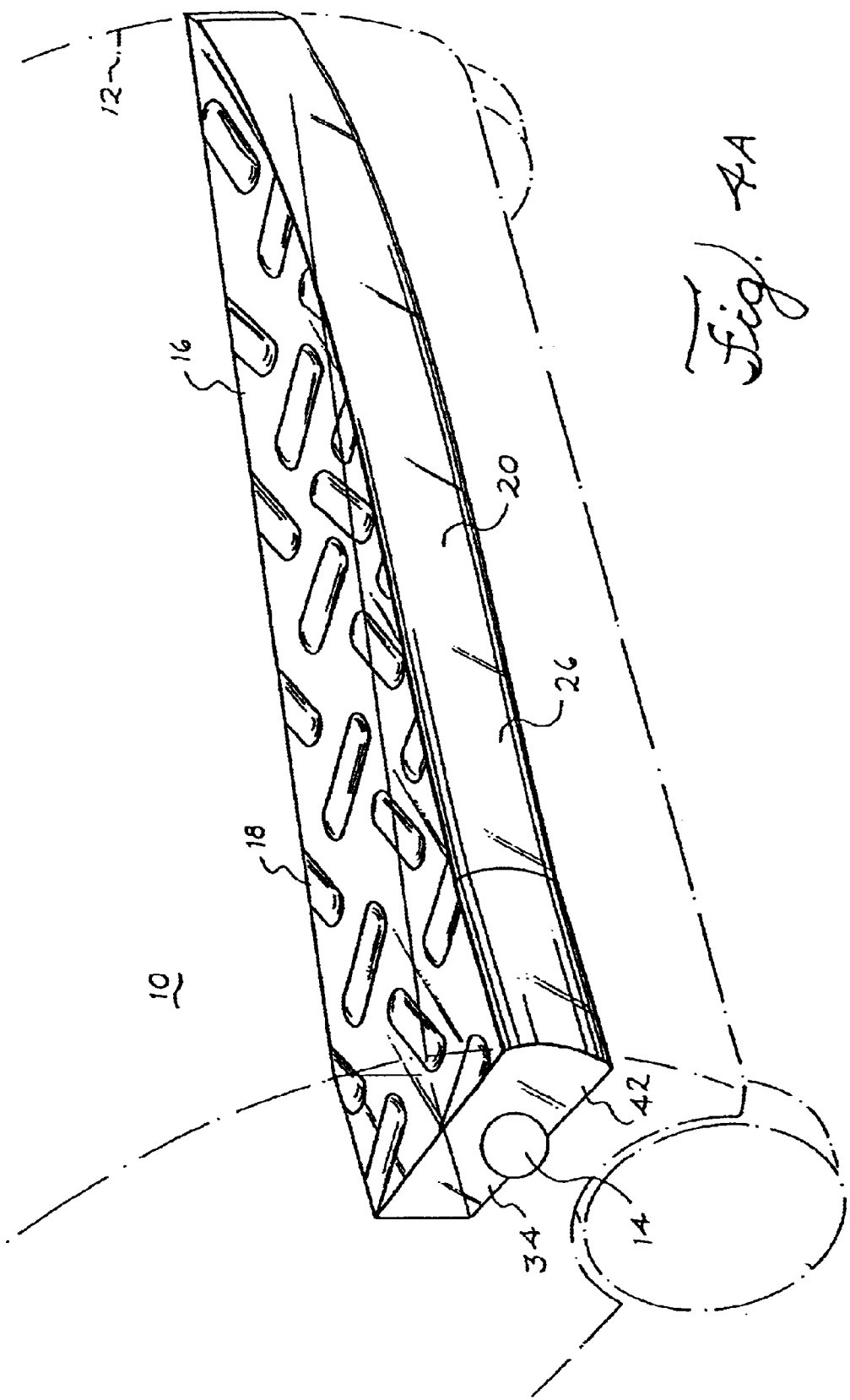
FIG. 4A schematically shows an embodiment of a light emitting system placed within a rear portion of a vehicle that employs the optical light manifold of FIG. 3 in accordance with the present invention.

As shown in FIGS. 4A–B, the light emitting system 10 includes a light source 14, such as a Light Emitting Diode (LED), that emits light along a first direction. A molded optical light manifold 16 is positioned in a lamp of a vehicle to receive light from the light source 14. The optical light manifold 16 includes a faceted optic 18 that receives light emitted from the light source 14 and redirects the light through an optical faceplate 20 of the optical light manifold 16 so as to provide illumination through a light emitting area. Thus, the faceted optic 18 receives and disperses light from the light source 14.

The optical light manifold 16 is formed by molding the faceted optic 18 and the optical faceplate 20 by an injection molding process. The materials used during the injection molding process preferably are pellets that are made of an optically clear material, such as acrylic or polycarbonate. As shown in FIG. 1, the optical face plate 20 is a one-piece material of uniform thickness that has a top face 22, a bottom face 24 and a front face 26 that is positioned therebetween. The top face 22 and bottom face 24 are substantially parallel to one another, as allowed by the manufacturing process of the optical face plate 20. Alternatively, the surfaces 22 and 24 may be part of the faceted optic 18 rather than the optical face plate 20. The front face 26 is generally perpendicular to the top face 22 and the bottom face 24 and has a shape that is dependent on the particular illumination pattern to be emitted by the light emitting system 10.

The faceted optic 18 is of substantially uniform thickness and has a generally L-shape that includes a faceted portion 28, an intermediate surface 30 with opening or hole 32 for subsequent filling, and a side surface 34, which is the entrance surface of light emitted by a light source, as shown in FIGS. 1 and 4A–B. Alternatively, the entrance surface 34 may also be part of the optical faceplate 20. The faceted optic 18 is dimensioned to cover a longitudinal rear opening 36 and a side opening 38 formed in the optical face plate 20. The thickness of the faceted optic 18 is preferably as thin as possible while easily moldable.

Figure 2:
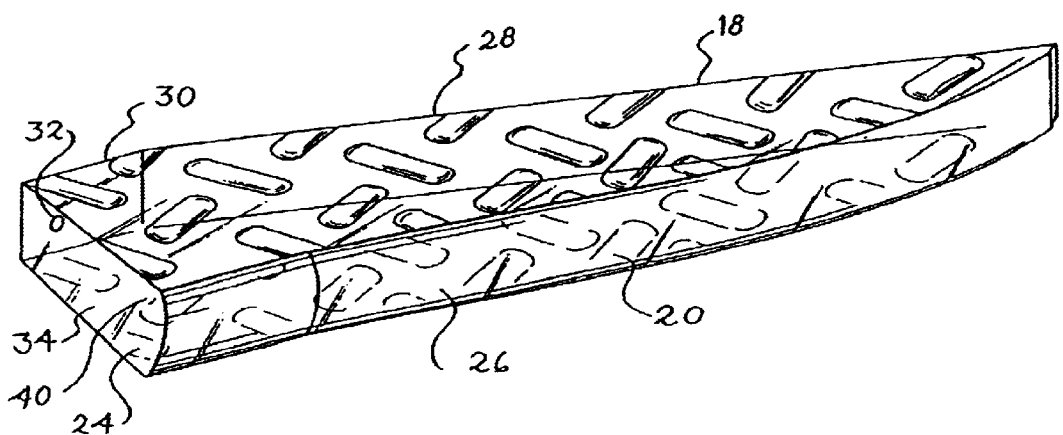
FIG. 2 is a front perspective view of the front face shell and the faceted part of FIG. 1 when joined together in accordance with the present invention.
Figure 3:
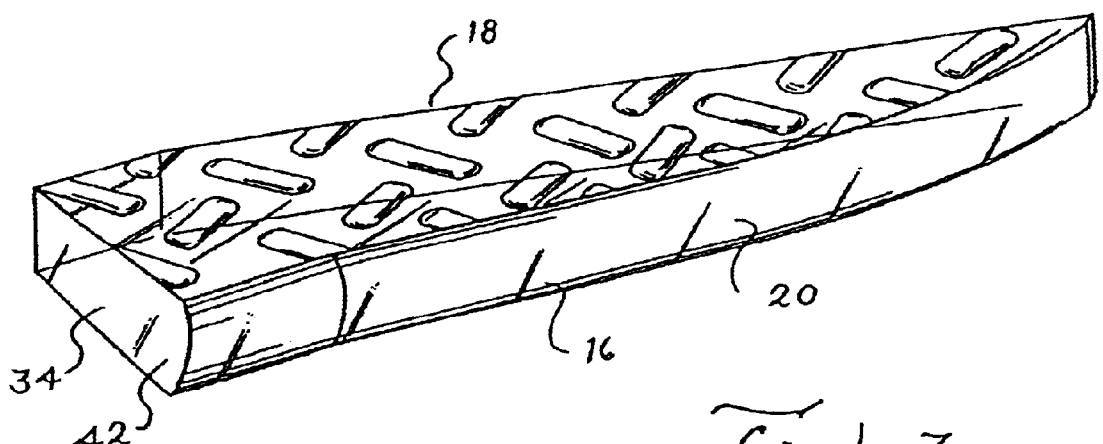
FIG. 3 is a perspective view of an optical light manifold that includes the front face shell and faceted part of FIG. 2 and including a fluid inserted within a cavity defined by the front face shell and the faceted part.

As shown in FIG. 2, the optical face plate 20 and the faceted optic 18 are placed next to each other and then joined to one another via application dependent processes, such as gluing, vibration welding or infrared welding processes. Once joined, the optical face plate 20 and the faceted optic 18 define a cavity 40.

At this stage, the cavity 40 is filled via the hole 32 with a fluid 42 that is optically compatible with the materials of the optical face plate 20 and the faceted optic 18. For example, the fluid preferably is a clear fluid with a refractive index comparable to that of molded resin or acrylic, such as 1.49. In addition, the fluid 42 should have a low freezing point (below −40° C.) and high evaporation temperature (above 85° C.). Examples of possible fluids are mineral oils, oil slurries and silicone. Other optical effects, such as presenting a wider viewing/illumination angle, may be achieved by slightly varying the refractive index of the fluid 40 with respect to the refractive index of the molded resin of the optical face plate 20 and the optical face 18. The fluid can also be an optically scattering fluid that displays a bulk diffusivity that causes the optical light manifold 16 to glow when illuminated by the light source 14 and cause a diffuse appearance. The fluid can also be phosphorescent and/or a gel, like glycerin gel, depending on the particular application for the optical light manifold 16. In the case of a phosphorescent fluid, the optical light manifold 16 generates an intensified glow when illuminated with certain types of light.

Once the fluid 42 fills the cavity 40, the single side opening (or hole) 32 of the cavity 40 is sealed by either a grommet, made of rubber or a flexible material, or an adhesive or glue that is placed within the side opening 32 and hardens upon its application. Alternatively, the hole 32 may be sealed by melting adjacent material of the intermediate surface 30 such that the hole 32 is closed with the melted material, which then cools and solidifies. Once the cavity is sealed, the fluid 42 and cavity 40 lack air voids.

The above-described manufacturing process for the optical light manifold 16 allows for a faster and cheaper process when compared with past optical light manifolds that were formed from glass or plastic as described previously. In particular, less cooling time is needed for the injection molding process and the cycle time for producing a single optical light manifold is less than 10% of that for the glass or plastic optical manifolds.

Once the above-described optical light manifold 16 is manufactured, it can be used as a brake light by being attached to a rear portion of a vehicle 12 as shown in FIGS. 4A–B where light enters the manifold through the side surface 34, and is transmitted through the liquid 42, to the faceted optic 18 as indicated by the arrows of FIG. 1. The light is then reflected from the facets of the faceted optic 18 and redirected toward the front face 26. The light is then transmitted through the liquid 42, through the front face 26 of the optical face plate 20 into the ambient atmosphere. Thus, the optical face plate 20 defines a light emitting area that corresponds to the front face 26.

The foregoing description is provided to illustrate the invention, and is not to be construed as a limitation. Numerous additions, substitutions and other changes can be made to the invention without departing from its scope as set forth in the appended claims. For example, the present invention can be adapted for manufacturing a lens. In this case, the facets of optic 18 are removed and the light source 14 is positioned facing portion 28 so that light emitted from light source 14 is received by portion 28 and transmitted therethrough. The transmitted light then passes through the liquid 42 and then is transmitted through the front face 26. The optical properties of the lens can be varied by varying the shapes of portion 28, front face 26 and the liquid 42.

We claim:

1. An optical light manifold, comprising:
   an optical faceplate having a refractive index;
   said optical faceplate defining a light emitting area;
   a faceted optic having said refractive index;
   said faceted optic joined to said optical faceplate defining a cavity therebetween; and
   a fluid disposed within said cavity, wherein said fluid is optically compatible to said manifold and said fluid is of a disposition of phosphor so as to fluoresce upon illumination by a light source.

2. The optical light manifold according to claim 1, wherein said optical faceplate is of a substantially uniform thickness.

3. The optical light manifold according to claim 1, wherein said faceted optic is of uniform thickness.

4. The optical light manifold according to claim 1, further comprising a sealable opening disposed on an outside surface of said joined optical faceplate and/or of said faceted optic.

5. An optical light manifold, comprising:
   an optical faceplate having a refractive index wherein said optical faceplate is an injection molded or otherwise formed optical faceplate;
   said optical faceplate defining a light emitting area;
   a faceted optic having said refractive index;
   said faceted optic joined to said optical faceplate defining a cavity therebetween; and
   a fluid disposed within said cavity.

6. The optical light manifold according to claim 5, wherein said fluid is optically compatible to said manifold.

7. The optical light manifold according to claim 6, wherein said fluid is a clear fluid with a refractive index comparable to that of molded resin.

8. The optical light manifold according to claim 6, wherein said fluid is a scattering fluid that displays bulk diffusivity causing said molded optical light manifold to glow when illuminated by a light source.

9. The optical light manifold according to claim 6, wherein said fluid is a gel.

10. The optical light manifold according to claim 5, further comprising a sealable opening disposed on an outside surface of said joined optical faceplate and/or of said faceted optic.

11. An optical light manifold, comprising;
    an optical faceplate having a refractive index;
    said optical faceplate defining a light emitting area;
    a faceted optic having said refractive index wherein said faceted optic is an injection molded faceted optic;
    said faceted optic joined to said optical faceplate defining a cavity therebetween; and
    a fluid disposed within said cavity.

12. The optical light manifold according to claim 11, wherein said fluid is optically compatible to said manifold.

13. The optical light manifold according to claim 12, wherein said fluid is a clear fluid with a refractive index comparable to that of molded resin.

14. The optical light manifold according to claim 12, wherein said fluid is a scattering fluid that displays bulk diffusivity causing said molded optical light manifold to glow when illuminated by a light source.

15. The optical light manifold according to claim 12, wherein said fluid is a gel.

16. The optical light manifold according to claim 11, further comprising a sealable opening disposed on an outside surface of said joined optical faceplate and/or of said faceted optic.

17. The light emitting system comprising:
    a light source that emits light along a first direction; and
    a molded optical light manifold that is positioned to receive said light from said light source, said molded optical light manifold comprising:

an optical faceplate having a refractive index;
said optical faceplate defining a light emitting area;
a faceted optic having said refractive index;
said faceted optic joined to said optical faceplate defining a cavity therebetween; and
a fluid disposed within said cavity, wherein said fluid is optically compatible to said manifold and said fluid is of a disposition of phosphor so as to fluoresce upon illumination by a light source.

18. The light emitting system according to claim 17, wherein said optical faceplate is of a substantially uniform thickness.

19. The light emitting system according to claim 17, wherein said faceted optic is of a substantially uniform thickness.

20. The light emitting system according to claim 17, further comprising a sealable opening disposed on an outside surface of said joined optical faceplate and faceted optic.

21. The light emitting system according to claim 17, further comprising a sealable opening disposed on an outside surface of said joined optical faceplate and faceted optic.

22. A light emitting system comprising:
a light source that emits light along a first direction; and
a molded optical light manifold that is positioned to receive said light from said light source, said molded optical light manifold comprising:
an optical faceplate having a refractive index wherein said optical faceplate is an injection molded optical faceplate;
said optical faceplate defining a light emitting area;
a faceted optic having said refractive index;
said faceted optic joined to said optical faceplate defining a cavity therebetween; and
a fluid disposed within said cavity.

23. The light emitting system according to claim 22, wherein said fluid is optically compatible to said manifold.

24. The light emitting system according to claim 23, wherein said fluid is a clear fluid with a refractive index comparable to that of molded resin.

25. The light emitting system according to claim 23, wherein said fluid is a scattering fluid that displays bulk diffusivity causing said molded optical light manifold to glow when illuminated by said light from said light source.

26. The light emitting system according to claim 23, wherein said fluid is a gel.

27. The light emitting system according to claim 22, further comprising a sealable opening disposed on an outside surface of said joined optical faceplate and faceted optic.

28. A light emitting system comprising:
a light source that emits light alone a first direction; and
a molded optical light manifold that is positioned to receive said light from said light source, said molded optical light manifold comprising:
an optical faceplate having a refractive index;
said optical faceplate defining a light emitting area;
a faceted optic having said refractive index wherein said faceted optic is an injection molded faceted optic;
said faceted optic joined to said optical faceplate defining a cavity therebetween; and
a fluid disposed within said cavity.

29. The light emitting system according to claim 28, wherein said fluid is optically compatible to said manifold.

30. The light emitting system according to claim 29, wherein said fluid is a clear fluid with a refractive index comparable to that of molded resin.

31. The light emitting system according to claim 29, wherein said fluid is a scattering fluid that displays bulk diffusivity causing said molded optical light manifold to glow when illuminated by said light from said light source.

32. The light emitting system according to claim 29, wherein said fluid is a gel.

33. The light emitting system according to claim 28, further comprising a sealable opening disposed on an outside surface of said joined optical faceplate and faceted optic.

34. A light emitting system comprising:
a light source that emits light along a first direction; and
a molded optical light manifold that is positioned to receive said light from said light source, said molded optical light manifold comprising:
an optical faceplate having a refractive index;
said optical faceplate defining a light emitting area;
a faceted optic having said refractive index;
said faceted optic joined to said optical faceplate defining a cavity therebetween; and
a fluid disposed within said cavity wherein said faceted optic receives said light emitted from said light source and redirects said light through said optical faceplate so as to provide illumination through a light emitting area.

35. The light emitting system according to claim 34, wherein said faceted optic receives and disperses light from a light source.

36. The light emitting system according to claim 34, wherein said fluid is optically compatible to said manifold.

37. The light emitting system according to claim 36, wherein said fluid is a clear fluid with a refractive index comparable to that of molded resin.

38. The light emitting system according to claim 36, wherein said fluid is a scattering fluid that displays bulk diffusivity causing said molded optical light manifold to glow when illuminated by said light from said light source.

39. The light emitting system according to claim 36, wherein said fluid is a gel.

40. The light emitting system according to claim 34, further comprising a sealable opening disposed on an outside surface of said joined optical faceplate and faceted optic.

41. A method of forming an optical light manifold, comprising:
forming a faceted optic;
forming an optical faceplate;
joining said faceted optic to said optical faceplate to define a cavity therebetween, wherein said joining comprises a vibration welding process; and
filling said cavity with a fluid.

42. The method according to claim 41, wherein said fluid is a clear fluid with a refractive index comparable to that of a molded resin.

43. The method according to claim 41, wherein said fluid is a scattering fluid that displays bulk diffusivity.

44. The method according to claim 41, further comprising sealing said manifold upon completion of said filling.

45. A method of forming an optical light manifold, comprising:
forming a faceted optic:
forming an optical faceplate;
joining said faceted optic to said optical faceplate to define a cavity therebetween, wherein said joining comprises an infrared welding process; and
filling said cavity with a fluid.

46. The method according to claim 45, wherein said fluid is a clear fluid with a refractive index comparable to that of a molded resin.

47. The method according to claim 45, wherein said fluid is a scattering fluid that displays bulk diffusivity.

48. The method according to claim 45, further comprising sealing said manifold upon completion of said filling.

49. A method of forming an optical light manifold comprising:
   a faceted optic;
   forming an optical faceplate;
   joining said faceted optic to said optical faceplate to define a cavity therebetween; and
   filling said cavity with a fluid, wherein said fluid is phosphorescent.

50. The method according to claim 49, further comprising sealing said manifold upon completion of said filling.

* * * * *

UNITED STATES PATENT AND TRADEMARK OFFICE
CERTIFICATE OF CORRECTION

PATENT NO. : 6,707,974 B2
DATED : March 16, 2004
INVENTOR(S) : James D. Tarne, I et al.

It is certified that error appears in the above-identified patent and that said Letters Patent is hereby corrected as shown below:

Column 5,
Line 50, after "emits light" delete "alone" and substitute -- along -- in its place.

Signed and Sealed this

Fourteenth Day of December, 2004

JON W. DUDAS
*Director of the United States Patent and Trademark Office*